United States Patent Office 3,506,082
Patented Apr. 14, 1970

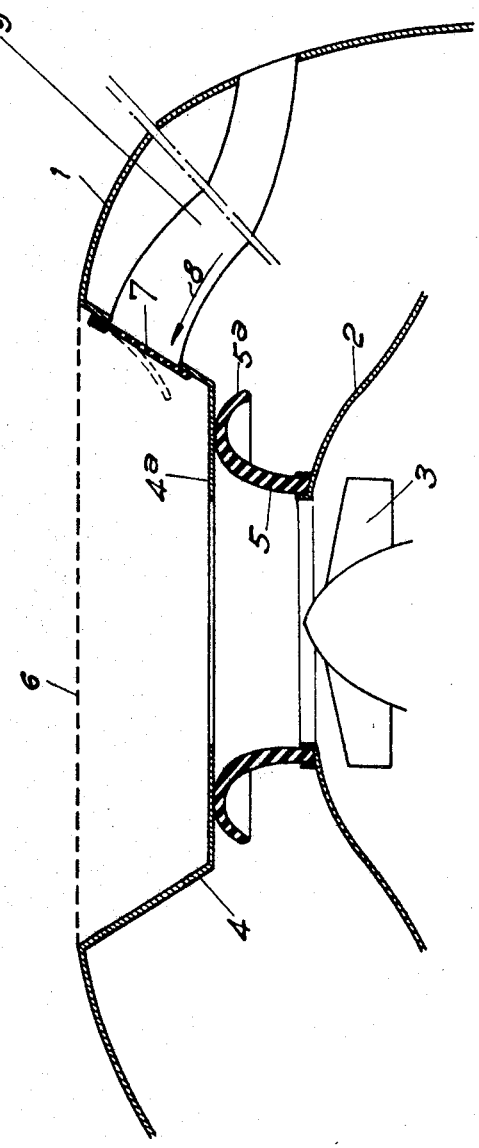

3,506,082
ENGINE COOLING ARRANGEMENTS
Jean Cadiou, Paris, France, assignor to Societe Anonyme Automobiles Citroen, Paris, France
Filed Jan. 9, 1968, Ser. No. 696,588
Claims priority, application France, Jan. 16, 1967, 3,330
Int. Cl. B60k 7/00
U.S. Cl. 180—54
5 Claims

ABSTRACT OF THE DISCLOSURE

An arrangement for cooling an automobile engine including a duct leading from atmosphere to the engine fan. The duct is divided into a rigid and a flexible portion, the latter having a lip which abuts against an internal flange of the rigid portion whereby relative movement between the engine and bodywork of the vehicle can be accommodated. If the main intake of the duct should become blocked, air is admitted through an auxiliary duct and an automatic flap valve.

This invention relates to automobile vehicles and in particular to arrangements for cooling the engines thereof.

In certain previously proposed automobile vehicles, the air intended to cool the engine is only partially ducted between the atmosphere and the engine fan. As a result, some of the air may reach the fan by another path; recycling of the atmosphere beneath the bonnet may thus result and this air is liable to become polluted.

In other previously proposed automobile vehicles, the air is ducted, over its path from the atmosphere and the fan, through a flexible sleeve of which the two ends are respectively secured to the bodywork and to the casing of the fan. Any possibility of recycling of the air beneath the bonnet is thus avoided; but the engine is no longer cooled if the opening in the external wall of the bodywork becomes blocked; furthermore, the sleeve must be relatively strong in order to be able to resist the forces resulting from the displacement of the engine with respect to the bodywork.

The present invention has for its object a ventilation duct for the engine of an automobile vehicle which overcomes these various disadvantages.

According to the present invention there is provided in an automobile vehicle comprising an engine, a fan including a casing for supplying cooling air to the engine, and a duct providing communication from the atmosphere to the fan, the improvement comprising a rigid portion forming part of the said duct, a flexible portion forming part of the duct and communicating with said rigid portion, and a flexible lip at one end of the flexible portion.

Further according to the present invention there is provided in an automobile vehicle, a bodywork, an engine mounted within said bodywork, a fan assembly for cooling the engine including a casing having an inlet and a bladed rotor mounted within the casing, and a duct providing communication from atmosphere to the fan inlet, the improvement comprising a portion of said duct of flexible material and communicating with the inlet of said fan casing, means defining a thin lip integral with said portion of flexible material, a portion of said duct of substantially rigid material and having a cross-section which increases towards the outside of said bodywork, means defining an inwardly extending flange at the inner end of said substantially rigid portion, said lip bearing against said flange, a flexible flap valve mounted in the wall of the rigid portion, an auxiliary duct communicating with the atmosphere at a position spaced from the inlet from atmosphere of said duct, and a grill extending across the inlet of said duct, said flap valve being arranged to open to admit air from the auxiliary duct to the said duct only when the pressure in said duct is below the pressure in said auxiliary duct.

An embodiment of a ventilation duct in accordance with the invention, will no be described, by way of example, with reference to the sole figure of the accompanying drawings which shows diagrammatically a section of this duct.

In the drawing, the external wall 1 of the bodywork of the automobile vehicle is shown and also the casing 2 of a fan 3.

In order to lead the air to the fan 3, there is provided a continuous ventilation duct which comprises a rigid portion 4 of a flexible portion 5.

The rigid portion 4 widens outwardly and is arranged coaxially with the fan 3. Its external end is secured at the edge of an opening which is provided in the wall 1 and has a grille 6.

The flexible portion 5 is secured at one of its ends to the casing 2. Its other end terminates at a narrow lip 5a bearing on an internal rim or flange 4a of the portion 4.

Valves of rubber 7 are applied over openings provided in the portion 4 of the ventilation duct. These valves are disposed in such a manner as to allow the passage of air from atmosphere through the duct inwardly, as indicated by the arrow 8 and to prevent flow in the opposite direction. To each of these valves an auxiliary duct is connected of which the other end leads to the exterior of the vehicle, these ducts and the valves being so arranged that when functioning normally, the valves remain applied against their seats.

It will be seen from the preceding description that the ventilation duct in accordance with the invention normally prevents recycling of the atmosphere beneath the bonnet. It accommodates, with respect to the wall 1, vibration of the engine on slowing down or during idling, as well as its longitudinal or transverse movements, without being subjected to substantial forces during these movements. Finally, in the case of obstruction of the grille 6, the valve 7 opens as a result of the depression set up in the duct by the fan 3, thus ensuring a continuity of cooling of the engine by supply of air provided through another circuit. This circuit may be constituted by the auxiliary duct 9 thus also enabling avoidance of recycling of air beneath the bonnet.

It will be self-evident that the invention should not be considered to be limited to the embodiments described and shown but covers, on the contrary, all modifications. Thus in particular the flexible portion 5 may be fixed to the rigid portion 4, the lip 5a bearing against the housing 2.

I claim:
1. In automobile vehicle,
   a bodywork,
   an engine mounted within said bodywork,
   a fan assembly for cooling the engine including
      a casing having an inlet and
      a bladed rotor mounted within the casing, and
   a duct providing communication from atmosphere to the fan inlet,
   a portion of said duct of flexible material and communicating with the inlet of said fan casing,
   means defining a thin lip integral with said portion of flexible material,
   a portion of said duct of substantially rigid material and having a cross-section which increases towards the outside of said bodywork,
   means defining an inwardly extending flange at the inner end of said substantially rigid portion, said lip bearing against said flange,
   a flexible flap valve mounted in the wall of the rigid portion, an auxiliary duct communicating with the atmosphere at a position spaced from the inlet from atmosphere of said duct, and a grill extending across the inlet of said duct, said flap valve being arranged to open to admit air from the auxiliary duct to the said duct only when the pressure in said duct is below the pressure in said auxiliary duct.

2. An automobile vehicle comprising:

an engine, a fan including a casing for supplying cooling air to the engine, a first duct providing communication from the atmosphere to the fan, a second duct capable of communicating with the interior of the said duct, and a valve arranged to control flow through said second duct, said valve being capable of passing a flow of air therethrough only when the air pressure in the second duct exceeds that in the said first duct.

3. An automobile vehicle according to claim 2 wherein said first duct comprises a rigid portion and a flexible portion, a flexible lip being provided at one end of the flexible portion, and wherein said valve is mounted on the wall of said rigid portion.

4. An automobile vehicle according to claim 2 wherein said valve opens to admit air to the interior of said first duct only when the pressure externally of said first duct exceeds the pressure internally thereof.

5. An automobile vehicle according to claim 2 wherein said rigid portion diverges towards the exterior of the vehicle.

References Cited

UNITED STATES PATENTS

| 2,358,663 | 9/1944 | Scott-Iverson | 180—54 |
| 2,581,996 | 1/1952 | Bachle | 180—54 |
| 2,644,541 | 7/1953 | Bachle | 180—54 |

FOREIGN PATENTS 1,034,340  4/1953  France.

LEO FRIAGLIA, Primary Examiner

M. L. SMITH, Assistant Examiner